June 25, 1957    WOLF-WITO VON WITTERN    2,796,863

PRESSURE RESPONSIVE PICK-UP MEASURING DEVICE

Filed Dec. 18, 1952      2 Sheets-Sheet 1

INVENTOR.
WOLF WITO VON WITTERN

BY Herold K. Losche
AGENT

Wade Koontz
ATTORNEY
AND

June 25, 1957 WOLF-WITO VON WITTERN 2,796,863
PRESSURE RESPONSIVE PICK-UP MEASURING DEVICE
Filed Dec. 18, 1952 2 Sheets-Sheet 2
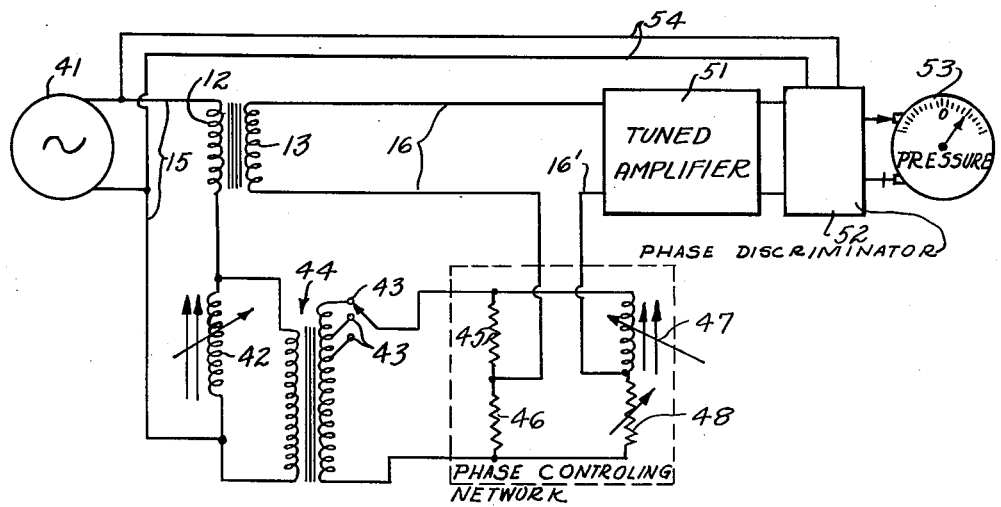
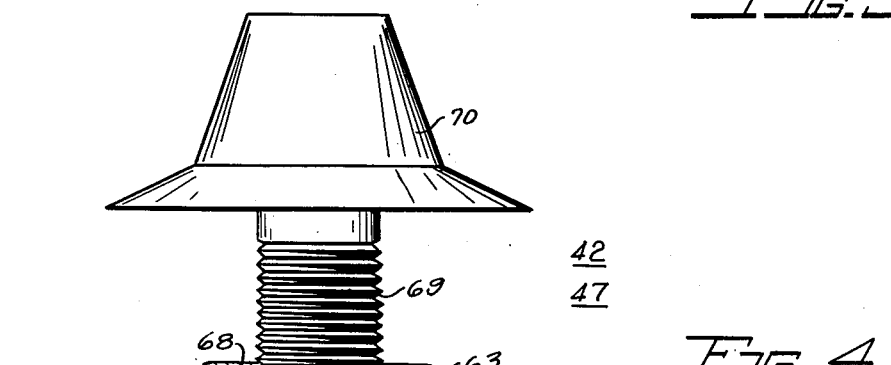
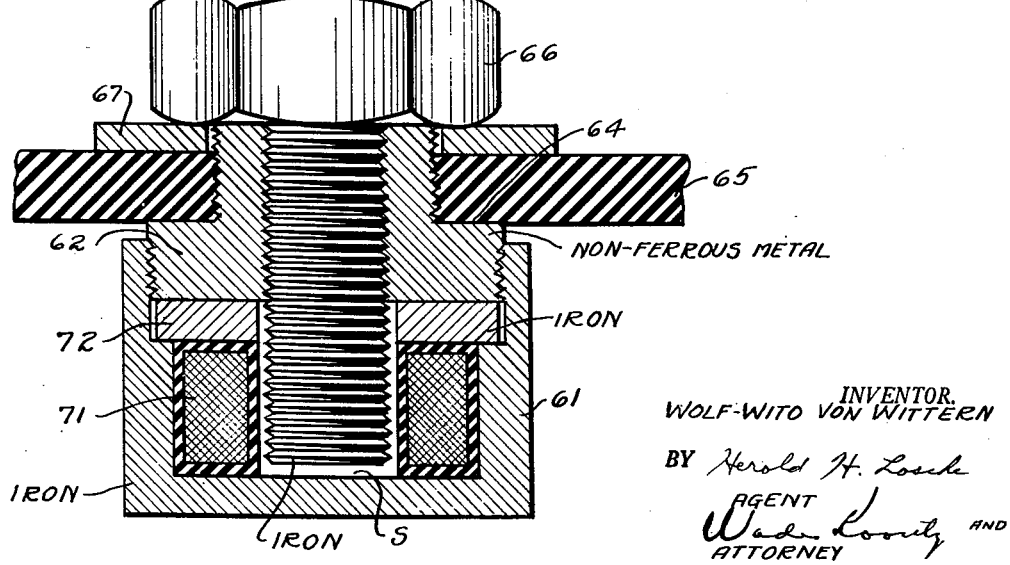
INVENTOR.
WOLF-WITO VON WITTERN
BY
AGENT
AND
ATTORNEY

United States Patent Office 2,796,863
Patented June 25, 1957

2,796,863

PRESSURE RESPONSIVE PICK-UP MEASURING DEVICE

Wolf-Wito von Wittern, Dayton, Ohio, assignor to the United States of America as represented by the Secretary of War Application December 18, 1952, Serial No. 326,806

3 Claims. (Cl. 128—2.05)

(Granted under Title 35, U. S. Code (1952), sec. 266)

The invention described herein may be manufactured and used by or for the United States Government for governmental purposes without payment to me of any royalty thereon.

The present invention relates to an inductive type physical deflection sensitive or pressure responsive pick-up unit and related electric circuit indicating means therefor for transforming pressures in a pressure medium represented by mechanical movement in the unit into electrical values operative in the circuit means providing visual or recorded pressure readings of such pressure mediums.

In accordance with this invention, the pressure responsive pick-up unit is in the form of a cylindrical body having a metal diaphragm or membrane of magnetic material closing one end thereof which diaphragm is in close airspaced relation to a transformer core providing a part of the transformer magnetic circuit. Primary and secondary electrical windings are positioned on the transformer core with the leads thereof extending out the end of the cylindrical body opposite the diaphragm. This last mentioned end of the cylindrical body is fitted on the end of a flexible tube through which the primary and secondary winding leads pass to an electric circuit means. The primary winding of the transformer is energized by an alternating electrical energy source which produces a flux relation with the secondary winding through the diaphragm, the mutual inductance thereof being varied in correspondence with pressures on the diaphragm which inductance variations modulate the electrical values in the secondary electrical circuit to be measured and recorded or indicated by indicating elements. Pressure measurements may thus be obtained by positioning the pressure pick-up unit directly in a pressure medium to be measured. The construction and arrangement of the pressure pick-up unit and its related circuit is readily adaptable to meet most size requirements; for example, the pressure pick-up unit may be made of such small size as to be used in arteries to measure blood pressure or in ureteral ducts, canals, vessels, or other members of the human or animal body and such purposes were particularly in mind in the development of this invention. It may be readily understood that this invention may also be used in getting pressure readings in fluid mediums of inanimate objects as well.

It is a general object of this invention to provide an inductive type pressure measuring device having a pressure pick-up unit adapted to meet most size requirements to which the device is to be put and particularly to be made of such small sizes as to permit it to be positioned directly in an artery for taking blood pressure or in any other small passage or part of the human or animal body.

The above object and other objects and purposes or uses of the invention will become more apparent as the description proceeds when taken in conjunction with the accompanying drawings illustrating the invention, in which:

Fig. 3 is a wiring diagram to be used in developing a visual indication by the use of a pressure pick-up unit; and Fig. 4 is a central longitudinal sectional view of a variable inductance for use in the circuit of Fig. 3.

In detecting or indicating pressures in physiological research or diagnosis it is desirable to insert a pressure pick-up unit directly into the fluid medium such as in a blood vein, artery, or other vessel, canal, etc., to be measured in pressure, positive or negative with respect to a reference pressure. In order to make this possible such a pressure pick-up unit must be extremely small. The present invention makes it possible to construct such small size pressure pick-ups although the pressure pick-ups may be constructed in any predetermined size best fitted for the use to which it is to be put.

Figure 1:
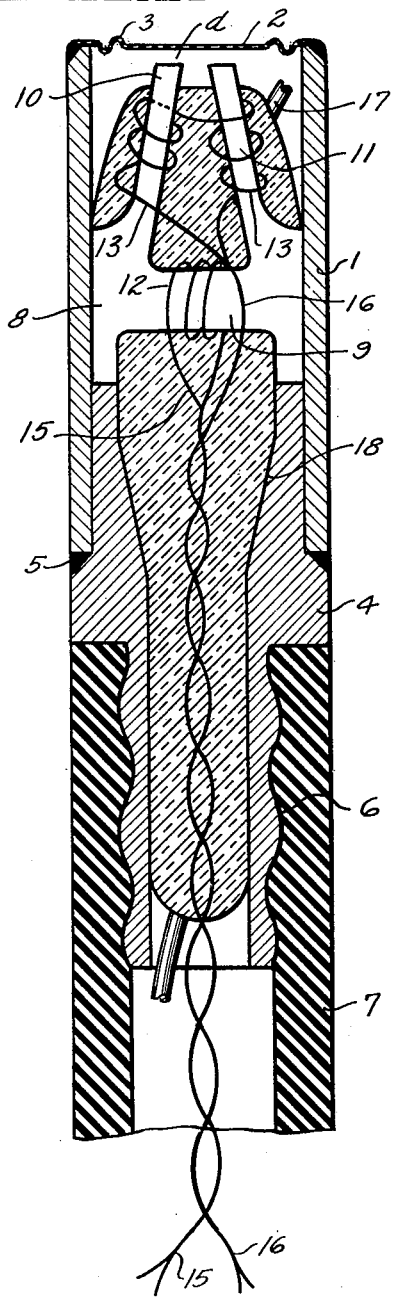
Fig. 1 is a central longitudinal sectional view of a preferred form of a pressure pick-up unit.

Referring more particularly to Fig. 1, the pressure pick-up comprises a small cylindrical metal tube 1 of non-magnetic material having an iron diaphragm 2 soldered over one end thereof. The diaphragm is preferably provided with circular concentric corrugations 3 near the marginal edge to increase the flexibility of the central portion thereof. The lower end of the tube 1 fits over a reduced portion of a tubular base element 4 and is soldered or brazed as at 5. The lower end of the element 4 is provided with a ribbed tubular extension 6 over which is mounted a thin flexible tube 7 serving as a conduit for wire leads extending to an indicating apparatus and an electric energy source.

Fixed at the upper end of the base element 4 is a U-shaped iron core element 8 which includes a transverse portion 9 with two upwardly extending legs 10 and 11. The transverse portion 9 has an electrical winding 12 thereon, and the two legs 10 and 11 have a coupled winding 13 thereon. The leads 15 to the winding 12 are twisted about each other, the leads 16 to the windings 13 are twisted about each other, and the two pairs of leads 15 and 16 twisted about each other to reduce the electromagnetic coupling between the leads to minimize the influence of this electro-magnetic coupling on the electrical values transmitted for pressure measurement readings. The leads extend out through the base element 4, the ribbed tubular extension 6, and the flexible tube 7 to the electrical means, later to be described. A pressure balance tube 17 is positioned through the tube 1 and tubular base element 4, one end lying adjacent to the diaphragm 2 and the other end extending into the flexible tube 7. The open spaces within the tube 1 and tubular base element 4 about the core 8, windings 12 and 13, leads 15 and 16, and tube 17 are filled with heat resistant porcelain glue 18 which retains the elements in a permanent position, the pressure equalizing tube permitting the pressure under the diaphragm to always be equal to that in the flexible tube 7 which may be ambient atmospheric pressure or predetermined reference pressure, as appropriate in use. The tube 1, the base element 4, and the flexible tube 7 are all of equal diameter to provide a pressure pick-up unit and attached tubing with a smooth unbroken cylindrical outer wall.

In assembling the parts of the pressure pick-up unit shown in Fig. 1, the diaphragm 2 and pole ends of the transformer legs 10 and 11 are positioned with a predetermined airspace or distance $d$ therebetween to obtain optimum results in the magnetic circuit established through the iron core element 8 and the diaphragm 2 in the mechanical movement range of the diaphragm for the pressure range measured. The distance $d$ shown in Fig. 1 is exaggerated for clarity.

Figure 2:
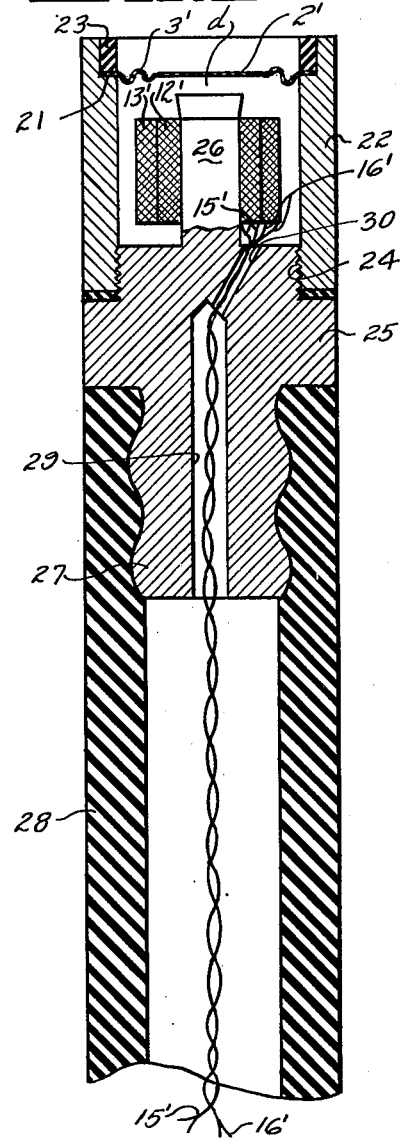
Fig. 2 is a central longitudinal sectional view of another embodiment of a pressure pick-up unit.

The embodiment of the pressure pick-up unit shown in Fig. 2 is similar to that shown in Fig. 1 in results and functions but differs in constructional details as will now be pointed out. A diaphragm 2' of magnetic material having corrugations 3', as the diaphragm 2, is fixed on a shoulder 21 in the tube 22 of magnetic material by a metallic ring 23. The ring 23 is soldered in the member 22 in the condition of high compression against the shoulder 21 with the periphery of the diaphragm 2' compressed tightly therebetween. The lower end of the tube 22 is internally threaded and screwed onto a reduced portion 24 of a base element 25 of magnetic material. The base element 25 has an upstanding pole portion 26 concentric with the threaded reduced portion 24 and a downwardly extending ribbed extension 27 on which a flexible tube 28 is frictionally held. A blind bore 29 extends upwardly into the base element 25 through the ribbed extension 27 thereof. A bore 30 connects the blind bore 29 with the space surrounding the pole portion 26. Two electric windings 12' and 13' are placed over the pole portion 26 with the leads 15' and 16' of each, respectively, being twisted and the two pairs being twisted together and extended out through the bores 29 and 30 and the flexible tube 28 to the electric circuit means, later to be described. These leads are so twisted for the reason stated in the description of these leads indicated by corresponding numerals unprimed in Fig. 1. The bores 29 and 30 are sufficiently large to accommodate the winding leads as well as to provide a pressure equalizing passage between the chamber formed under the diaphragm and the flexible tube. A distance between the diaphragm 2' and the unattached end of the pole portion 26 is airspaced a distance d in the same manner as in the modification shown in Fig. 1, but further adjustment of this space d may be made by the screw threaded connection 22, 24.

The usual way to measure and record reluctance changes of magnetic circuits is to measure the resultant inductance change of a coil around the cross section of the circuit. This method, however, is influenced by the ohmic resistance change of the coil due to temperature. In the present invention the temperature effect of the resistance is completely avoided by using a transformer type of reluctance measuring in which the primary windings are fed by a constant oscillator current while the open circuit voltage of the secondary windings is measured. The open circuit output voltage of a transformer secondary depends only on the current of the primary winding and on the mutual inductance. This voltage from the secondary is independent of the ohmic resistance in the circuits.

The circuit which best carries out the above purpose is shown in Fig. 3 which circuit is inclusive of the electrical circuit in the pressure pick-up unit. The impedance of each winding 12 or 13 is the same and therefore it does not matter which winding is used as the primary. For convenience in this description, the winding 12 will be described herein as the primary and the winding 13 as the secondary. A constant alternating current is obtained by using a carrier frequency oscillator circuit generated from a source represented at 41, the inner impedance of which is large in comparison to the impedance of the primary winding 12 together with its leads 15. An iron core variable inductance 42 is connected in series with the primary winding 12 providing a fine voltage amplitude adustment of the voltage across the inductance 42. A coarse adjustment of this voltage amplitude is obtained by tapping various points 43 on the secondary of a transformer 44 the primary of which is connected across the terminals of the variable inductance 42. The secondary of the transformer 44 is connected to a phase controlling network in which there are two parallel branch circuits, the first of which includes two resistances 45 and 46 connected in series with each other across the secondary winding of the transformer 44 and the second of which includes an iron core variable inductance 47 and a variable resistance 48 connected in series with each other across the resistors 45 and 46. An illustrative variable iron core inductance 42 and 47 is shown in Fig. 4 of the drawings. On lead 16 from the secondary winding 13 of the pressure pick-up unit is connected between the two resistances 45 and 46 and the other lead 16 is connected to the input of a conventional tuned amplitfier 51, as legended. The junction of the variable inductance 47 and the variable resistance 48 is also connected to the of the amplifier 51 by the lead 16'. The variable resistance 48 and the variable inductance 47 provide, respectively, a coarse and fine adjustment of the voltage phase through the transformer 44 with respect to that of the secondary winding 13 of the pressure pick-up unit impressed on the amplifier. By adjustment of the amplitude and phase—that is, the adjustment of the elements 42, 43, 47, and 48—the input voltage of the amplifier 51 can be made zero for a certain reference pressure on the diaphragm 2 (or 2') of the pressure pick-up unit. The circuit including the transformer 44, the inductance 42, and the amplitude and phase shifting elements therefore constitutes a compensating circuit. The output of the amplifier 51 is connected through a phase discriminator 52 including a rectifier of the well known commercial type to a visual or recording instrument herein illustrated as a pressure indicating gauge 53. The phase discriminator is coupled directly to the alternating current generator 41 in the conventional manner by leads 54. The impedance of the alternating current generator 41 at the points to be connected to the leads 15 is large with respect to the impedance of winding 12 and its lead 15 in order to insure a constant current through the winding 12. The amplifier 51 must have a flat frequency response characteristic between the side band frequencies of the modulated carrier and the harmonics of the carrier must be suppressed in which case it may be necessary to include a filter network of any well known design in the amplifier circuit. The amplifier 51, the phase discriminator 52, and the oscillator generator 41 may be of conventional stock design and will not be described further herein.

The variable inductances 42 and 47 in the above described circuit are of a particular design as more clearly shown in Fig. 4. The body of this device is composed of a lower cup-shaped member 61 internally threaded at the perimeter and in screw threaded engagement with a support member 62. The upper portion of the support member 62 has a reduced threaded neck 63 which forms a shoulder 64 that permits the device to be mounted in a hole in an instrument panel, or the like, represented at 65. A nut 66 is threaded on the neck 63 to engage a washer 67 and thus compress the instrument panel 65 between the washer 67 and shoulder 64. The support member 62 has a concentric threaded bore 68 through which is screwed a threaded shaft 69 having a control knob 70 fixed at the top thereof. A coil winding 71 rests in the bottom of the cup-shaped member 61 such that the threaded shaft 69 extends downwardly through the central opening thereof. The coil winding 71 corresponds to the winding in the adjustable inductances 42 and 47. The coil winding 71 is retained in position by a ring 72 held down by the support member 62. The elements and members 61, 69, and 72 are all of ferrous metal having good magnetic properties. The inductive reactance is modified in the winding 71 by adjustment of the threaded screw 69 to vary the air space S between the end of the threaded shaft 69 and the end wall of the cup-shaped member 61 which variable space S varies the gap in the magnetic flux circuit through the elements 61, 69, and 72.

In the operation of the device, the alternating electrical energy source 41 is turned on with the pressure pickup unit resting in the reference pressure which may be atmosphere. The voltage amplitude elements 42 and 43 and the phase controlling elements 47 and 48 are all adjusted to zero any voltage being fed to the amplifier which will bring the pressure indicating gauge 53 to a zero reading. The alternating current source 41 produces a constant alternating current through the primary winding 12 which induces a voltage in the secondary winding 13 by reason of the magnetic flux through the transformer pole and diaphragm of the pressure pick-up unit which induced voltage constitutes a carrier frequency voltage amplitude modulated by deflection of the diaphragm 2 (or 2'). This carrier is cancelled out at the input of the amplifier 51 by the adjustment of the amplitude and phase controls as hereinbefore described. With the pressure gauge 53 so zeroed, the pressure pick-up unit is placed in the pressure medium to be measured, as for example the blood vein of a person or animal. The pressure on the diaphragm 2 (or 2') changes the distance $d$ between this diaphragm and the iron core of the transformer wherein the lines of flux through the secondary winding 13 are changed which produces a change in the amplitude of the voltage. The induced voltage across the secondary winding 13 of the pressure pick-up unit is therefore modulated in amplitude to the extent of the change in mutual inductance caused by positive or negative pressure deflecting the diaphragm 2 (or 2') inwardly or outwardly, respectively, changing the distance $d$. By means of the compensating circuit at the amplifier input the voltage is adjusted to zero at a reference pressure and has a certain value at positive or negative pressure, the difference being that the voltage produced by a positive pressure is 180 degrees out of phase relation to the voltage produced by negative pressure. This voltage is amplified in the amplifier 51 and rectified in the phase discriminator-rectifier 52 which produces a positive or negative voltage (depending on the pressure being above or below the reference pressure) across the indicating gauge 53. This voltage modulation is amplified in the amplifier 51 and the phase relation, positive or negative, is determined by the phase discriminator and rectified to provide a positive or negative direct current voltage measurable on the indicating gauge 53 above or below zero, the reference pressure. The indicating gauge 53 is calibrated in inches of mercury, or with other legends as desired, to register pressure readings in accordance with actual pressures to which the diaphragm of the pressure pick-up unit is exposed.

While I have shown and described only two embodiments of the pressure pick-up unit and only one embodiment of the electrical circuit and of the variable inductance, it is to be understood that various modifications and changes may be made in the constructional details without departing from the scope of this invention as illustrated and described and I desire to be limited only by the scope of the appended claims.

I claim:

1. A device for measuring small physical deflections by electromagnetic means, comprising an alternating carrier current source, a deflection sensitive pickup of transformer type insertable into an artery for being exposed to arterial blood pressure changes and which pickup is energized by the carrier current to provide an output voltage amplitude modulated by the deflection, a phase and amplitude adjusting means deriving its input from the alternating current source and developing a reference voltage of constant phase and amplitude to be added to the pickup output voltage for the isolation of the amplitude difference therebetween as being a measure of the magnitude and the duration in time of the deflections, amplifying means to which is applied as input the amplitude difference voltage between the pickup output voltage and the reference voltage with the amplified amplitude difference voltage as output, a phase discriminating rectifier to which is applied as input the amplifying means output voltage and a carrier voltage direct from the carrier current source as reference and which produces as output a voltage proportional to the amplitude and of sign corresponding to the sense of the corresponding deflections at the pressure pickup, and an indicator of the voltage output from the phase discriminator rectifier as arterial blood pressure changes applied to the pickup.

2. A temperature insensitive deflection indicating device, comprising a carrier alternating current source of substantially constant amplitude and frequency, a pickup transformer device having a primary of low input impedance compared with that of the current source and having a secondary across which is produced an output voltage modulated by the deflections to be sensed by the pickup device, an amplitude and phase controlling circuit deriving its input from the carrier current source, an adjustable inductor in said amplitude and phase controlling circuit for the amplitude adjustment thereof, an adjustable inductor and resistor combination in said amplitude and phase controlling circuit for the phase adjustment thereof providing an output voltage of equal amplitude and of opposite phase to the amplitude and phase of the pickup device output at a reference deflection, an amplifier for the modulated carrier frequency said amplifier having an input impedance which added to the output impedance of the phase controlling network is high in comparison with the impedance across the secondary of the pickup device transformer, a phase discriminating rectifier to which is applied as input the amplifier output voltage and a carrier voltage direct from the current source as reference and which produces as output a direct current voltage proportional to the amplitude and of sign corresponding to the sense of the corresponding deflections at the pressure pickup, and an indicator presenting deflection magnitudes sensed by said pickup device.

3. A pressure responsive pick-up measuring device, comprising a nonmagnetic tube insertable into an anatomical artery, a pressure responsive iron diaphragm closing an end of the tube, a constant oscillator current supply, a first transformer pole portion spaced from the diaphragm and energized from inductively coupled first transformer primary and secondary windings with the primary winding fed a constant oscillator current from the supply and with the first transformer secondary winding inductively coupled with the first transformer winding; a second transformer primary winding upon which the constant current is impressed by being connected in series with the first transformer primary winding and the second transformer primary winding being shunted by a first iron core variable inductance for the fine voltage amplitude adjustment thereof and the second transformer primary winding being inductively coupled with a secondary winding, a phase controlling network pair of parallel branch circuits shunting the second transformer secondary winding and one of the branch circuits containing an iron core variable inductance, a tuned amplifier series connected with the phase controlling network across the first transformer secondary winding, a phase discriminator deriving input from the constant current source and from the tuned amplifier, and a pressure indicating gage connected with the phase discriminator and indicating pressure changes applied to the iron diaphragm of the tube.

References Cited in the file of this patent

UNITED STATES PATENTS

| Number | Name | Date |
|---|---|---|
| 2,320,881 | Newton | June 1, 1943 |
| 2,361,738 | Bird | Oct. 31, 1944 |
| 2,362,661 | Peters | Nov. 14, 1944 |
| 2,508,370 | Bozoian | May 23, 1950 |
| 2,615,936 | Glass | Oct. 28, 1952 |
| 2,630,007 | Howe et al. | Mar. 3, 1953 |
| 2,634,721 | Greenwood | Apr. 14, 1953 |
| 2,640,971 | Macgeorge | June 2, 1953 |
| 2,641,742 | Wolfe et al. | June 9, 1953 |
| 2,648,328 | Hathaway et al. | Aug. 11, 1953 |

FOREIGN PATENTS

| Number | Country | Date |
|---|---|---|
| 498,032 | Great Britain | Dec. 28, 1938 |